June 3, 1947.  F. SAVOYE  2,421,393
EQUIPMENT FOR THE PROJECTION OF STEREOSCOPIC VIEWS AND FILMS
Filed Jan. 23, 1942   6 Sheets-Sheet 1

Inventor
François Savoye
By [signature]
Attorney

Inventor
François Savoye
By [signature]
Attorney

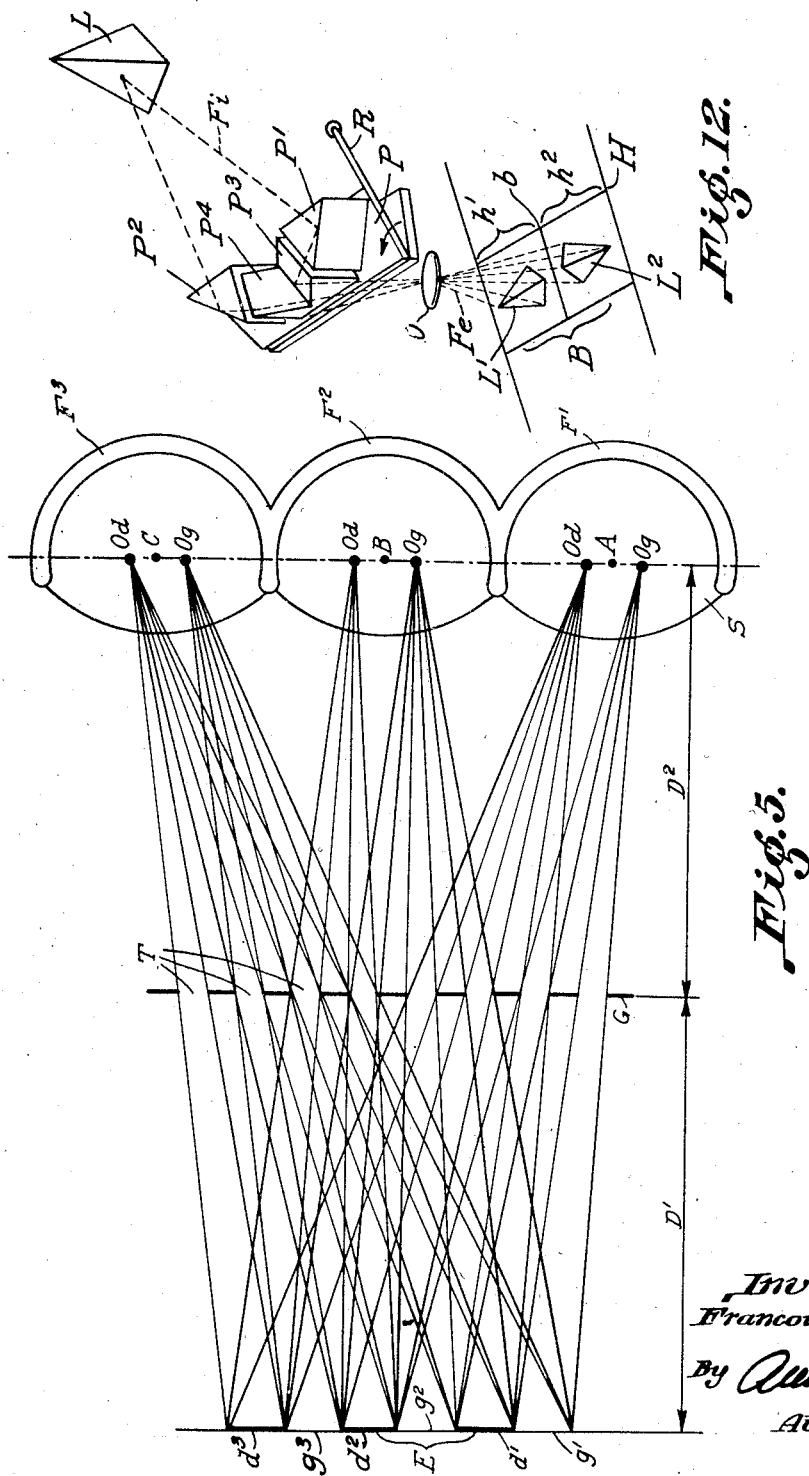

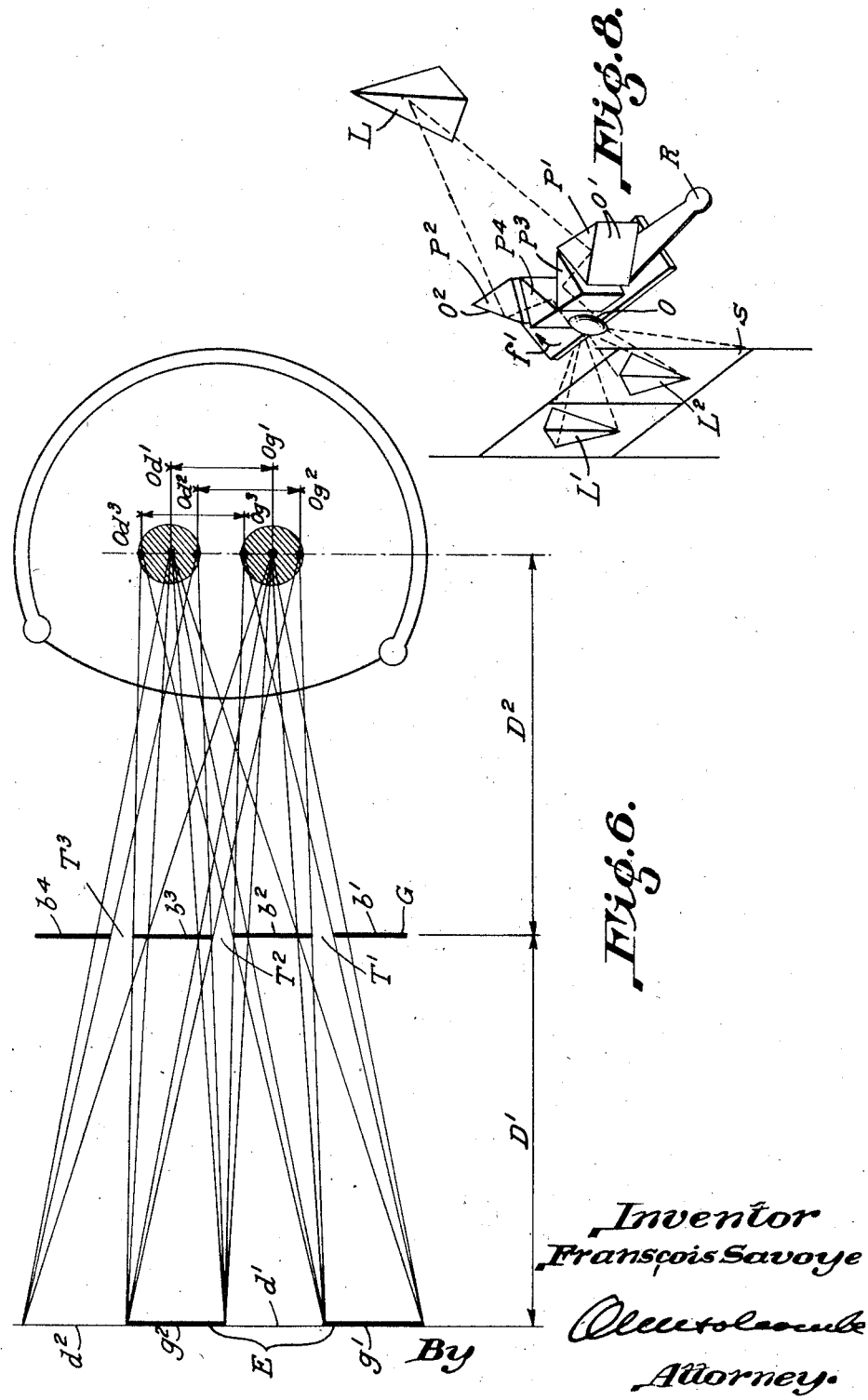

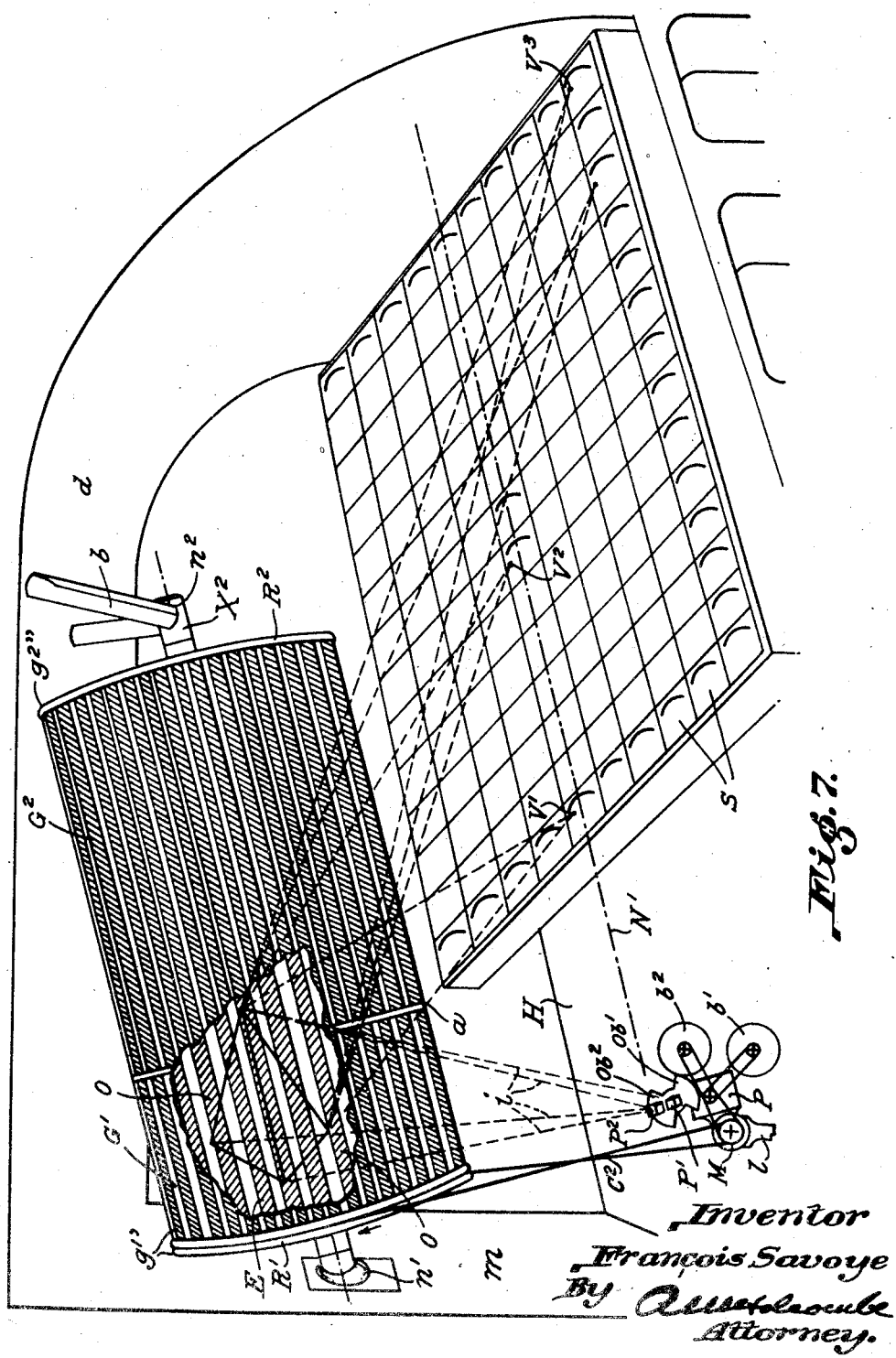

June 3, 1947.  F. SAVOYE  2,421,393
EQUIPMENT FOR THE PROJECTION OF STEREOSCOPIC VIEWS AND FILMS
Filed Jan. 23, 1942  6 Sheets-Sheet 6
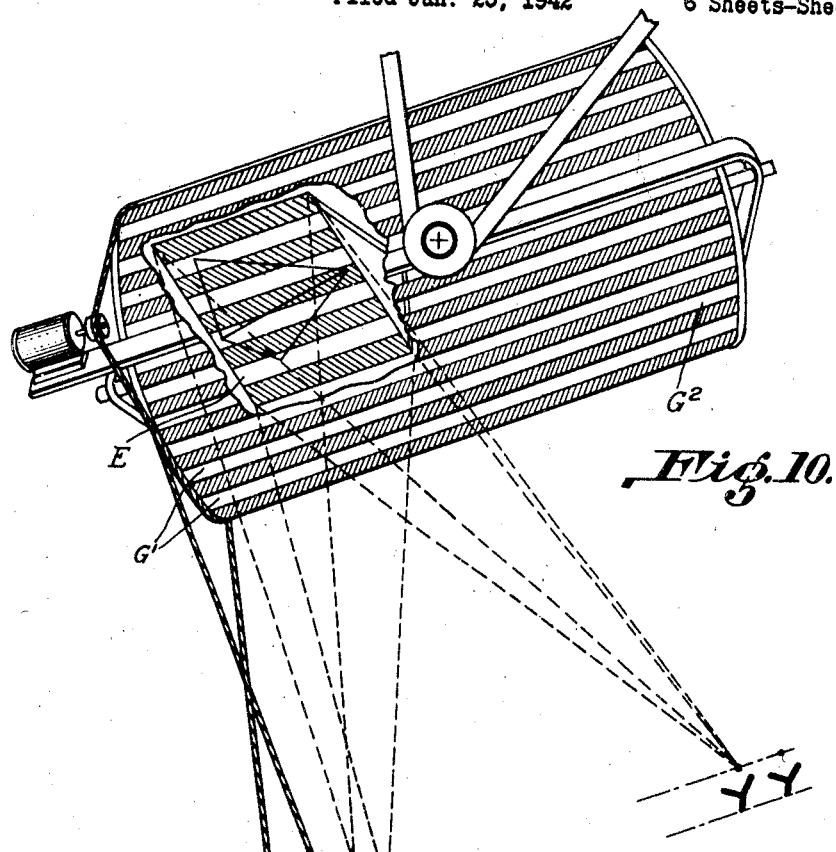
Fig. 10.
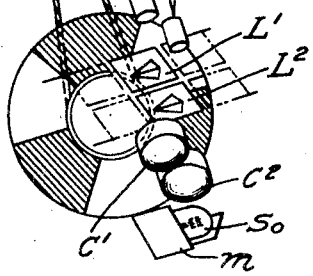
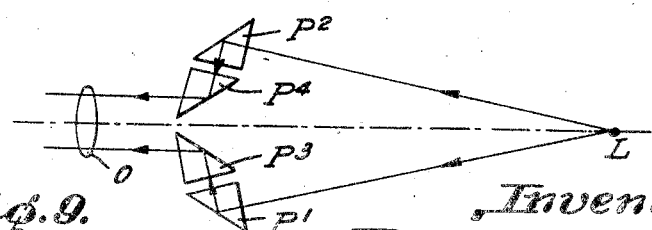
Fig. 9.
Inventor
François Savoye
By Allingame
Attorney Patented June 3, 1947

2,421,393

UNITED STATES PATENT OFFICE 2,421,393

EQUIPMENT FOR THE PROJECTION OF STEREOSCOPIC VIEWS AND FILMS

François Savoye, Paris, France; vested in the Attorney General of the United States Application January 23, 1942, Serial No. 427,956
In France January 29, 1941

4 Claims. (Cl. 88—16.6)

This invention relates to improvements in equipments and devices for the projection of stereoscopic views.

A first object of the invention is to improve the equipments and devices for the projection of stereoscopic views in order to give a clear impression of the relief to all the spectators which are on a certain surface of the show-room, the said spectators being nevertheless comfortably installed on their seat.

Another object of the invention is to give this clear impression of the relief without the spectator being obliged to keep a position in which he is almost motionless and which is, therefore, tiresome when kept during the whole performance.

Still another object of the invention is to arrange the stereoscopic views on a film of normal dimensions, so as to make the best use of the whole surface of the film.

The methods, devices and films for the projection of stereoscopic views which permit to attain the above mentioned objects show the characteristic features which result from the following description and more particularly from the appended claims.

Equipments and methods according to invention are shown by way of examples in the appended drawings in which:

Figures 5 and 6 are two diagrams of an equipment according to another embodiment of the invention.

Figure 7 is a general view of an equipment for the cinematographic projection of stereoscopic views according to the invention.

Figure 8 is a perspective view of an apparatus for taking photographic views according to the invention.

Figure 9 is a diagram showing the way of the rays of light in the apparatus for taking photographic views of Figure 1.

Figure 10 is a perspective view of a projection apparatus for a film with stereoscopic views obtained by means of the apparatus according to Figures 8 and 11.

Figure 12 is a diagram showing the luminous trace in the case of another apparatus for taking photographic views according to the invention.

Figure 1:
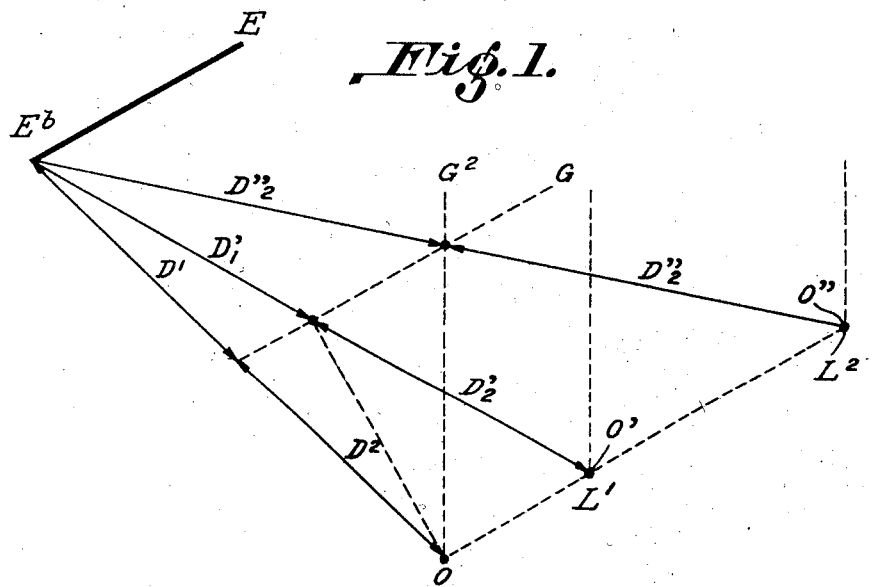
Figure 1 is a diagram of an equipment for a cinema-room according to the invention.

The equipment shown in Figure 1 comprises a projection screen E which is slightly inclined with respect to the horizontal plane and a grating G located at a distance $D^1$ from the screen E and parallel to this screen E.

The plane on which the seats of the spectators rest is parallel to the plane of the screen E and to the plane of the grating G. Therefore, the middle plane of the eyes of the spectators which is parallel to the plane of the seats is itself parallel to the plane of the screen E and to the plane of the grating G; this results in that for all the points O, O', O'' of this plane, i. e., for the eyes of the spectators, the ratio between the distance from the grating and the screen and the distance from the eye of the spectator and the grating is constant:

$$\frac{D^1}{D_2} = \frac{D'^1}{D'_2} = \frac{D''^1}{D''_2}$$

These distance ratios which are common to all the spectators can be so chosen that each spectator has a perfect vision of the relief regardless of the position in the room.

Briefly stated, an equipment is provided in which the perfect adjustment for the maximum relief is obtained in the same manner for all the places of the spectators.

It is advisable to explain (see Figure 5) how the various factors of the equipment (distance from the grating to the screen and from the plane of the spectators to the plane of the screen, width of the free spaces of the grating and the like) are chosen so as to obtain for all the points of the plane O, O', O'' the vision of the maximum relief exactly in the conditions which are shown geometrically on the diagram of Figure 1: the left eye must see only the left elements of the views $g^1$, $g^2$, $g^3$ and the right eye must see only the right elements of the views $d^1$, $d^2$, $d^3$.

Figure 2:
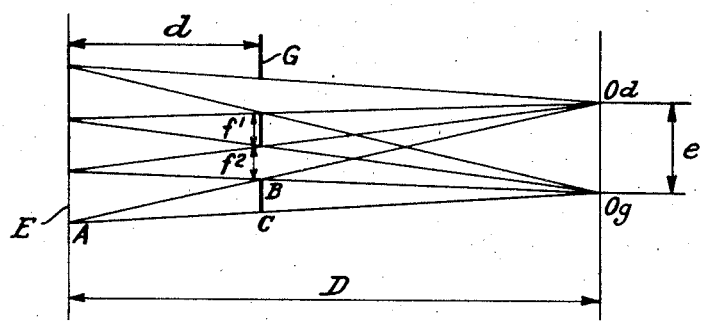
Figure 2 is a diagram which permits to calculate the spacing which it is convenient to give to the bars of the grating.

This calculation is explained by means of Figure 2 in which:

$e$ is the chosen spacing taken as base corresponding to the distance between both eyes $Od$ and $Og$;

$D$ is the distance between the screen E and the middle plane in which the spectators are located;

$d$ is the distance between the screen E and the grating G, $f^1$ and $f^2$ being the desired width for the intervals and the full parts respectively.

The similar triangles ABC and AOdOg give the ratio:

$$\frac{BC}{OdOg} = \frac{AC}{AOg}$$

$$f^1 = f^2 = \frac{AC}{AOg} \times OdOg = \frac{d}{D} \times e$$

The three planes shown in Figure 1 being parallel (screen, grating, middle plane of the eyes of the spectators), the preceding relation is met for all the points of the plane of the spectators; in other words: the perfect vision of the relief is obtained regardless of the place of the spectator in the plane.

There is a certain interest in making the height of the grating $G^1$ intercepting the beams of the projection apparatus as small as possible for a given apparatus, on the one hand in order to reduce the proportions of the same and, on the other hand, in order to increase the height of the grating $G^2$ and, accordingly, to permit to a larger number of spectators to see the corresponding relief.

Figure 3:
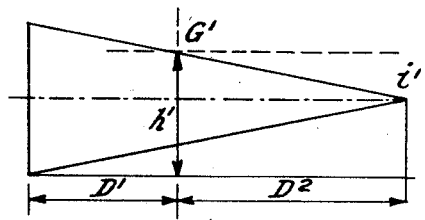
Figures 3 and 4 are two diagrams showing the position of the projection apparatus with respect to the screen.

In order to obtain this result, there would be desirable to offset the starting point of the beam of light with respect to the centre of the image (Figure 4) at $f^2$ for given distances $D^1$ and $D^2$; it will be seen in this figure that the intercepted height of the grating $G^1$ is smaller than that ($h^1$) of Figure 3 where the starting point of the beam of light is centered at $t^1$.

The inclined plane which supports the successive rows of seats for the spectators permits a comfortable instalment of the said spectators as well as an easy evacuation of the same; indeed, the said spectators are sitting on different rows of seats spaced out from the point O to the point O'' of Figure 1.

Figure 5 shows the manner in which the invention is applied to a comfortable equipment of the rooms in order to obtain a projection in relief, each of the eyes of the spectators being located in the maximum optical conditions. This equipment (Figure 5) comprises a projection screen E on which elements of images $g^1$, $g^2$, $g^3$ pertaining to the left image and elements of images $d^1$, $d^2$, $d^3$ pertaining to the right image of a stereoscopic pair have been projected. G is the selective grating inserted between the projection screen E and the spectators; $F^1$, $F^2$ and $F^3$ are three seats of one and the same row.

It is well known that the middle vision level of the generality of the spectators must be placed at a distance from the screen which is judiciously predetermined. Then the setting out of the places may be effected in the following manner: One considers the respective position of the image elements projected on the screen E as well as that of the selective elements of the grating. It is sufficient to take as the long base of the triangle the width of each image element and as small base the width of the intervals of the grating while causing a line to pass through each of the extremities of both bases. The apex of the triangle is the respective position of each eye. It is thus easy to determine in advance the respective position of all the eyes (left and right) of the spectators and then to locate the definitive position of each of the seats $F^1$, $F^2$, $F^3$ of the spectators.

The spectators A—B—C will have the eyes $Og$ (left) and $Od$ (right) in such a position that each eye will see only the image elements which are convenient for it, i. e., the left eye the left image elements and the right eye the right image elements. The spectator will obtain instantaneously and without any strain the normal position for the correct vision of the relief.

In Figure 5 the strictly exact positions of each of the eyes of the spectators have been shown. It is easy to see after the above given explanations that out of these strictly exact positions the selection of the images is not so good.

In order to avoid this inconvenience, the equipment according to Figure 6 comprises a screen E on which the image elements $g^1$, $g^2$ and $d^1$, $d^2$ are projected and a grating G the opaque elements of which $b^1$, $b^2$, $b^3$, $b^4$ are broader than the transparent spaces $T^1$, $T^2$, $T^3$. When making these lay-outs as explained with reference to Figure 5 one determines extreme positions for each eye; for instance, the central position of the right eye at $Od^1$ can be transferred to $Od^2$ and $Od^3$ and that of the left eye $Og^1$ can be transferred to $Og^2$ and $Og^3$. Owing to this arrangement the left and right eyes can move between these limits while maintaining a perfect selection. Thus the spectator is no longer bound to keep a tiresome immobility.

In the examples of Figures 1 to 8 one has supposed that the projection screen E is plane on its whole surface and also that the selective elements are arranged in a parallel manner at a certain distance from this screen, the said selective elements being, moreover, also parallel.

It is also possible to make equipments according to the invention with gratings of various forms but the bars of which are parallel or substantially parallel to the plane of the screen and to the plane of the eyes of the spectators.

Figure 7 shows diagrammatically a whole equipment made according to the invention and comprising a projection grating and a vision grating effecting a continuous rotating movement as explained hereinafter:

A score wheel $R^1$ rotates on its axis $X^1$ while a second wheel $R^2$ rotates on its axis $X^2$; both wheels are conveniently spaced with respect to one another, their axes being concentric. The axis 1 rotates in a bushing $n^1$ secured to the wall $m$, while the axis 2 rotates in the bushing $n^2$ which is fast with a frame $b$ secured to the ceiling of the room $d$; both above mentioned axes are concentric and have a suitable inclination with respect to the horizontal plane of the floor H.

Between both these wheels are stretched or secured parallel opaque stripes so that the whole forms a cylindrical grating which can rotate about the axes $X^1$ and $X^2$. The cylindrical projection grating $G^1$ is formed of opaque elements arranged in parallel stripes $g^{1'}$ and $g^{1''}$ and the free spaces have the same width or substantially the same width which is calculated according to the following formula:

$$f^1 = f^2 = \frac{d}{D} \times e$$

the number of the free spaces being a direct function of the circumference of the cylinder.

This projection grating is inserted between the projection apparatus P and the screen E which is arranged inwardly of the cylinder and which can be seen through the torn out part provided in the periphery of the cylinder in order to facilitate the explanation.

The plane of this screen is parallel to the axis of the cylinder and its position is fixed with respect to the selective elements. It is shown here viewed from the back and it is supposed to be slightly translucent. It permits to see the elementary image strips at a moment of rest, the strips which are shown with hachures pertaining, for instance, to the image of the right hand and the white strips to the image of the left hand. These strips are joined together edge to edge.

These elementary image strips are obtained by the passage of the two images which are projected by means of the projection apparatus P through the grating $G^1$. This projection apparatus can be of the conventional type generally designed for the projection on a flat surface and comprising a single object-glass and for a single image. But for the projection in relief this apparatus has been equipped with a complementary device according to the invention capable to project a film in which both images of a stereoscopic pair will have been produced in the place of a single view. This device has for its object to project each of these images from two points spaced with the distance between the eyes or at a distance giving a result which is substantially equivalent; it can be made by means of prisms or other organs giving the same results; $P^1$ is the optical system projecting one of the views and $P^2$ a second system projecting the other view, $P^1$ and $P^2$ being suitably spaced from another. The dotted lines $i$ show the direction of the beams of light coming from $P^1$ and $P^2$, passing through the selective elements and forming elementary images cut off on the screen E, the elements of the right hand image inserting themselves between those of the left hand image (hachured strips).

The vision grating $G^2$ shifted with respect to the projection grating $G^1$ is fast with the latter, which simplifies the construction of the whole apparatus.

The grating $G^2$ begins on the concentric ring $a$ and is arranged at a judiciously delimited height in order to permit the passage of the beams of light $i$. The more the height of the projection grating $G^1$ is reduced, the higher can be the vision grating $G^2$ for a given apparatus and, accordingly, the more the number of the spectators can be increased.

The selective elements of the grating $G^2$ are arranged between the ring $a$ and the periphery of the wheel $R^2$. The number of the opaque elements is the same as that of the grating $G^1$, but their respective width is increased in order to reduce the width of the free spaces and to convert into a broader zone the point corresponding to the optimum position of selectivity, as already explained with reference to Figures 7 and 8.

Accordingly, a suitably placed spectator sees the elements of the images of the stereoscopic pair by reflexion on the screen E through the grating $G^2$, the left eye seeing the elements pertaining to the left image and the right eye the elements pertaining to the right image.

The seats are distributed on an inclined plane S so that the middle plane $N^1$ of the generality of the eyes of the spectators is parallel or substantially parallel to the plane of the projection screen E.

The rows of seats are distributed in the manner which has been explained with reference to Figure 5: the central position of each seat depends upon the relative position of the said seat with respect to the screen so that both eyes of the spectators are in the optimum conditions for the vision of the relief.

Accordingly, all the spectators distributed on the plane S are in suitable positions in order that the vision of the relief is a maximum for each of them independently of the distance between them and the screen; for instance, the selection of the images is as good for each of the positions $V^1$, $V^2$, $V^3$.

This equipment is perfectly suitable for the projection of fixed or of moving pictures: indeed, the projection apparatus P mounted on its base (1) secured to the floor comprises a motor M which is also mounted on the base (1). The pulley of this motor drives by means of a belt $c^2$ and the score wheel $R^1$ the unit formed of both gratings $G^1$ and $G^2$ (projection grating and vision grating) in the direction of the arrow; thus, both these gratings rotate in a continuous manner and at a minimum speed which is such that owing to the persistance of the luminous impressions on the retina the grating $G^2$ is no longer visible.

The motor M drives also the projection mechanism: the film spools $b^1$ and $b^2$, the shutter with two vanes $Ob^1$ and $Ob^2$ inserted between the object-glass and the prism system $P^1$ and $P^2$ and the like.

For the good working of the shutter one establishes preferably a system where the opening and closing times are equal so that no effect prejudicial to the projection is produced. In the like manner, a constant speed relation exists between the closing time of the shutter and the time which is necessary for an opaque element of the grating $G^1$ for passing from a position to the following one.

The whole equipment can be suitably adapted for the projection of films in black or in colours, of mute films or of films with a sound record.

The projection grating $G^1$ and the vision grating $G^2$ can be independent and rotate with different speeds; it is also possible to vary the number of the selective elements and to modify the distance of the plane S from the level $N^1$ of the projection apparatus.

The opaque strips of each grating can be arranged on a transparent holder (lattice-work, transparent or perforated material and the like) or substituted by optical elements giving the same selective power.

In the like manner, in certain particular equipments one can contemplate a projection system in which the beams coming from the projection apparatus fall on a mirror before they attain directly the screen E.

The dispositions shown by way of example in Figure 7 indicate the conditions which are recommended for obtaining the best relief effect for a maximum number of spectators. But it is obvious that these arrangements can be modified for simplifying the equipment more particularly as regards existing projection rooms. Thus, the level in which are the eyes of the spectators may form a certain angle with respect to the plane of the screen.

The initial arrangements provided for obtaining the relief in perfect conditions can also be modified if it is desired to make a more summary equipment at less cost; the vision of the relief will still be obtained but not with its maximum of perfection.

In the preceding equipments the projection screen is parallel to the plane of the eyes of the spectators; an identical result can be obtained in an indirect manner through reflexion, for instance by means of a mirror; in such cases the position of the screen E with respect to the plane of the eyes of the spectators can have a certain inclination, the indispensable parallelism being optically re-established by means of the mirror.

The screen E which is fixed with respect to the grating and parallel to the axis of the cylinder can take certain different positions in order to obtain certain relief effects; more particularly this screen can take a certain inclination with respect to the axis or to the shutter elements. This screen, seen by direct reflexion, can be seen by transparency or in an indirect manner by means of a mirror.

The cylindrical form of the gratings can be replaced by a system of gratings moving in a manner strictly parallel to the plane of the screen; for instance, the said gratings can be formed of selective elements arranged on a unit of flexible chains, bands, discs and the like. These selective elements can correspond to those which have been described above or they can be made in another manner giving nevertheless similar optical effects.

By means of the preceding devices one can project films with any stereoscopic views, each transversal section of the film showing both stereoscopic images of the object in a predetermined position and at a predetermined moment.

However, the invention also covers apparatuses for taking views and stereoscopic projections permitting to obtain particular films to which the invention is related and which can be used more particularly in equipments according to the invention. Figure 8 shows more particularly an apparatus for taking views formed of an optical system $O^1$, $O^2$. Each system is formed of two total reflexion prisms $P^1$, $P^2$ and $P^3$, $P^4$. A lever fast with one of the prisms, for instance with the prism $P^1$, permits to adjust at will the angle of both optical systems $O^1$ and $O^2$ one with respect to the other and, accordingly, the distance which separates both images of the object. A single object-glass O is arranged between the unit formed of both optical systems $O^1$, $O^2$ and the sensitive surface S. One obtains thus for one and the same object L two images $L^1$ and $L^2$ disposed in the width of the film and corresponding to a predetermined position of this object L (Figure 9). These images are two stereoscopic views which can be then projected in any one of the equipments according to the invention. For this projection one can use a single projection apparatus or two projection apparatuses lighted by one and the same source of light.

Figure 10 shows more particularly an equipment similar to that of Figure 7 but in which a film with images $L^1$ and $L^2$ is passed which corresponds to the film obtained with the camera of Figure 8. Two condensers $C^1$, $C^2$ are lighted by one and the same source of light So, each of these condensers lighting one of the images $L^1$ and $L^2$ by means of the mirrors M. Each so lighted image gives rise to a beam of light and is projected on the screen E through the projection grating $G^1$.

The images which are thus formed on the screen are then observed by the spectators through the grating $G^2$ as more particularly explained with reference to Figure 7.

Figure 11:
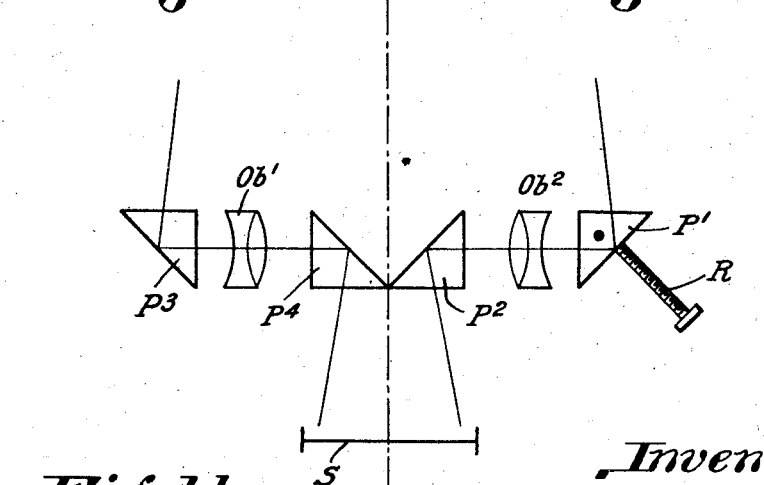
Figure 11 shows another device for taking photographic views according to the invention.

Numerous modifications can be made to the camera shown in Figure 9. More particularly (Figure 11) one can combine both object-glasses $Ob^1$ and $Ob^2$ with the group of prisms $P^1$, $P^2$, $P^3$, $P^4$, the image being formed on the sensitive surface S. As previously a control lever R permits to adjust the relative position of both prisms and, accordingly, the relative positions of both images.

Figure 12 shows another camera according to the invention and in which the prisms $P^1$, $P^2$, $P^3$, $P^4$ of both optical systems are so arranged that the emergent beams Fe are at about 90° from the incident beams $F^1$. One obtains thus on the sensitive surface images $L^1$ and $L^2$ which are opposed one to another with their base.

Figure 13:
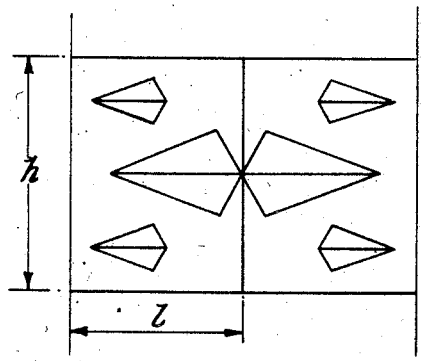
Figure 13 shows, on the contrary, a film with stereoscopic views according to the invention and obtained by means of the apparatus for taking views of Figure 13.
Figure 14:
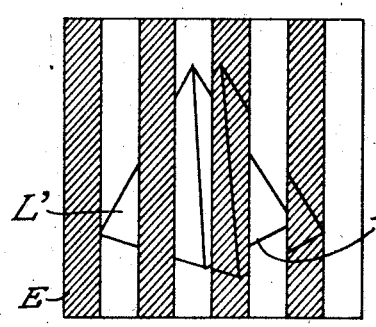
Figure 14 shows a screen on which the stereoscopic views of a film are projected according to the method which forms the subject matter of the invention.

The so obtained films permit of making a better use of the sensitive surfaces, as this easily results from the comparison between:

(a) A known film with stereoscopic views Figure 13 and
(b) A novel film with stereoscopic views Figure 14.

The known films in which stereoscopic pairs are used possess frames the width $l$ of which is lower than the height $h$; in these known films both images are symmetrical with another and so disposed that the height of the image corresponds to the height of the frame.

On the contrary, in the film according to the invention (Figure 13) both symmetrical images have their bases opposed one to the other so that the height of the image is disposed according to the half-width of the frame. In this case the spaces left free on the frame of the film can be used for auxiliary images, thus, the whole surface of the frame is much better utilized.

Figure 4:
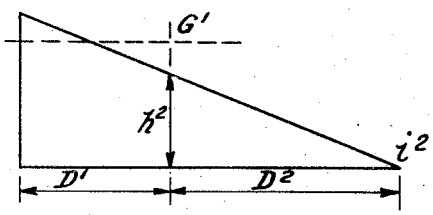

The film according to the invention permits also to obtain easily an offset projection according to Figure 4; the optical axis is then perpendicular to the common base of both images, which insures a uniform lighting of the whole surface of the images.

One can easily use the films of Figure 13 obtained by means of the camera of Figure 12 in any one of the equipments according to the invention for the projection of stereoscopic views. For this purpose it is sufficient to light the film which then forms the luminous object with respect to the object-glasses O, $P^1$, $P^2$, $P^3$, $P^4$, the image being then formed at L on the screen. The lever R permits to adjust the apparatus at will according to the distance of the object-glass from the screen and, accordingly, the shifting of both images in order to cause the relief effect to be materialized in front of or behind the screen.

One obtains thus on the screen (Figure 14) successive bands shown the ones light and the others dark and corresponding to the bars and to the free spaces of the projection screen.

I claim:

1. In an equipment for the projection of stereoscopic views, an elevated screen on which stereoscopic views are projected, a projector arranged below said screen, a plurality of seats for the spectators, spaced rearwardly from said projector and below and forwardly of said screen, a movable selecting device arranged between the projector and the screen and a second movable selecting device arranged between the seats and the screen.

2. In an equipment according to claim 1, wherein said selecting devices comprise slotted cylindrical members arranged longitudinally of each other on the same axis, and said screen is encircled by portions of both of said selective devices.

3. In an equipment according to claim 1, wherein said selecting devices and said screen are arranged to overlie the projector and some of said seats, the selecting devices and the screen having parallel axes located above both the projector and the seats.

4. In an equipment for the projection of stereoscopic views, a substantially horizontal floor, a projector mounted thereon, a screen on which stereoscopic views are projected elevated above and arranged at an acute angle to the floor; a cylindrical selective device encircling said screen and rotatable on an axis parallel to that of the screen, seats for spectators arranged on an inclined plane extending above the floor and below and forwardly of the screen, a second cylindrical selective device arranged between the seats and the screen with its axis parallel to that of the screen, the plane of the seats being parallel to the axes of the selective devices and the screen.

FRANÇOIS SAVOYE.

REFERENCES CITED

The following references are of record in the file of this patent:

UNITED STATES PATENTS

| Number | Name | Date |
|---|---|---|
| 1,772,782 | Noaillon | Aug. 12, 1930 |
| 2,029,300 | Arfsten | Feb. 4, 1936 |
| 2,240,131 | Carre | Apr. 29, 1941 |
| 1,851,705 | Herz | Mar. 29, 1932 |
| 1,952,519 | Transtrom | Mar. 27, 1934 |
| 2,106,752 | Land | Feb. 1, 1938 |
| 2,282,947 | Sherbinin | May 12, 1942 |
| 958,367 | Clawson | May 17, 1910 |
| 1,801,656 | Burkhardt | Apr. 21, 1931 |
| 2,012,995 | Ives | Sept. 3, 1935 |
| 2,240,131 | Berment | Apr. 29, 1941 |
| 2,309,879 | Willis | Feb. 2, 1943 |
| 2,100,634 | Coffey | Nov. 30, 1937 |

FOREIGN PATENTS

| Number | Country | Date |
|---|---|---|
| 449,856 | France | Jan. 6, 1913 |
| 349,548 | Great Britain | May 20, 1931 |
| 459,069 | Great Britain | Dec. 28, 1936 |
| 822,404 | France | Sept. 20, 1937 |